July 23, 1957 — E. L. CROSBY, JR — 2,800,098
PNEUMATIC VEHICLE TIRE INCORPORATING A LOW
AIR PRESSURE ALARM
Filed Feb. 1, 1954

*INVENTOR.*
EDWARD L. CROSBY, JR.
BY
Paul E. Kerst
*ATTORNEY*

United States Patent Office 2,800,098
Patented July 23, 1957

2,800,098

PNEUMATIC VEHICLE TIRE INCORPORATING A LOW AIR PRESSURE ALARM

Edward L. Crosby, Jr., South Bend, Ind.

Application February 1, 1954, Serial No. 407,368

8 Claims. (Cl. 116—34)

This invention relates to alarms for automatically warning a motorist when the air pressure in one of his tires falls below a predetermined safe value.

It is a well known fact that the useful life of a pneumatic tire is greatly shortened when it is operated for any appreciable amount of time in an underinflated condition. Yet it is often difficult for the motorist to tell when the pressure in a tire has gradually fallen to an unsafe level. Under such circumstances a tire may be ruined or have its life greatly shortened before the motorist is aware that anything is amiss.

In view of this fact, many devices and arrangements have been proposed for automatically warning the motorist upon the occurrence of low air pressure in a tire. Many of these devices are costly. Others are complicated to install and maintain. Some have a tendency to injure the tire in their operation. The defects of these prior art devices are such that none has gained the favor of the motoring public in spite of the obvious need for some such device.

It is an object of this invention to provide a means for warning of low air pressure in a vehicle tire, which means will involve substantially no added expense to the motorist.

It is another object of the invention to provide such a means which will require no special installation.

It is another object of the invention to provide such a means which will require no expenditure of either money or labor for its maintenance.

It is still another object of the invention to provide such a means which will not detract from the appearance of either the vehicle or its tires.

It is yet another object of the invention to provide such a means which will have no injurious effects on the tire at any time.

The foregoing and other objects and advantages of the invention are realized by a warning means which consists of a plurality of abutments molded onto the periphery of a vehicle tire along the side thereof and adjacent to the tread, but so positioned as to be out of contact with the road when the tire is properly inflated. The positioning of the abutments is such that when the air pressure in the tire has fallen to a level at which damage will be done to the tire by prolonged operation thereof in that condition, they will come into contact with the road, and will generate a sound which undergoes a repetitive variation or change in pitch. The variation in pitch is caused by the fact that the abutments are so spaced that their leading edges either progressively vary in spacing or undergo a repetitive change in spacing.

Referring now to the drawing.

Figure 1:
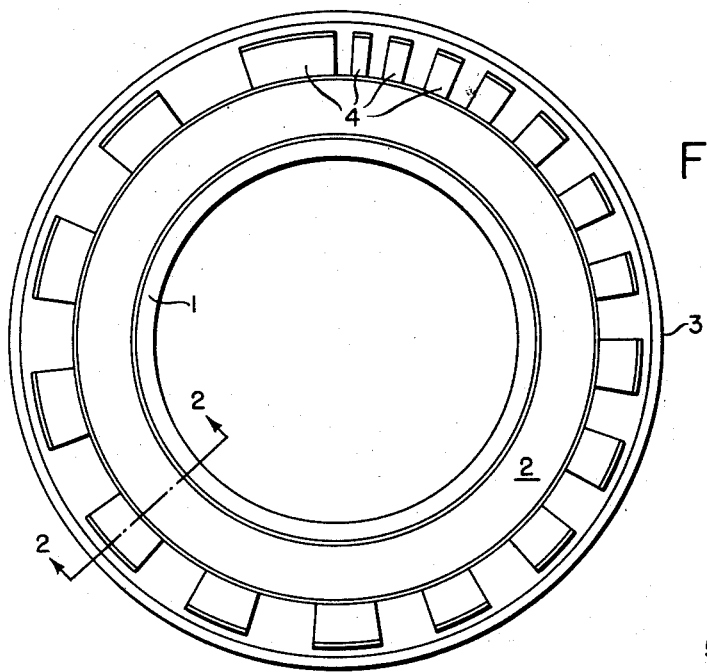
Fig. 1 is an elevational view of a vehicle tire embodying the invention.
Figure 2:
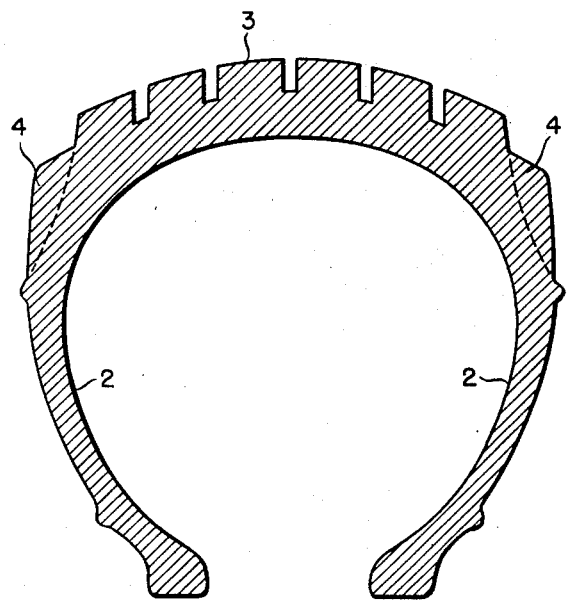
Fig. 2 is a cross-sectional view of the tire of Fig. 1, taken through one of the abutments along the line 2—2; and, Fig. 3 is a group of curves drawn to the same time base and showing three possible patterns of abutment periodicity for use in carrying out the invention.

Referring more particularly to the drawing, there is shown in Figs. 1 and 2 a pneumatic vehicle tire 1, comprising sidewalls 2 and tread 3. The construction of the tire is conventional in all respects except that molded onto and integral with the sidewall is a plurality of abutments 4. It will be noted in Fig. 1 that the abutments vary in width and in spacing. Starting at the top of the tire as illustrated and proceeding around to the right, it will be noted that both the abutments and their spacing increase in width as one proceeds.

In the operation of the embodiment of Fig. 1, the tire will perform in its normal fashion as long as it remains fully inflated. When, however, the air pressure in the tire falls below a safe level, it will be deformed to such an extent that the abutments 4 will come into contact with the surface of the road. When this occurs, the successive impact of the abutments will generate a sound which will have a recurring variation of pitch. This sound will be distinctive, since it will be unlike any other sound made by the tires or the vehicle, and it will thus serve immediately to warn the driver of the underinflated condition of the tire.

The variation in pitch is caused by the variation in the intervals of time between successive impacts of the abutments on the road as the tire revolves. Since it is the leading edge of the abutment which first comes into contact with the road, it is this portion of the abutment which is primarily responsible for the pitch of the resulting sound. The full length of the abutment does, however, make some contribution to the pitch and, accordingly, variation of abutment width, as well as variation in leading edge spacing, are employed in the preferred form of the invention, as illustrated in Fig. 1.

It will be noted that the abutments of the tire of Fig. 1 lie in a ring concentric with the tire and that the corresponding lateral edges of the abutments are separated by distances which vary progressively as one proceeds around the tire, in a single sequence of variation. One set or the other of these lateral edges will be the leading edges of the abutments, depending upon the direction of rotation of the tire.

Instead of the abutments of substantial and varying width shown, protuberances of equal and negligible width, such as dots, may be used if desired, the variable pitch being produced solely by the variation in spacing. Dots, however, will wear down more quickly than the abutments of Fig. 1. They would also be less effective than the abutments in acting as a secondary tread surface after the original tread has worn down enough to bring them into road contact in the normal inflated condition of the tire. Although this would be but a secondary function of the sound producing protuberances, it would, nevertheless, be a consideration in favor of the arrangement of Fig. 1.

Figure 3:
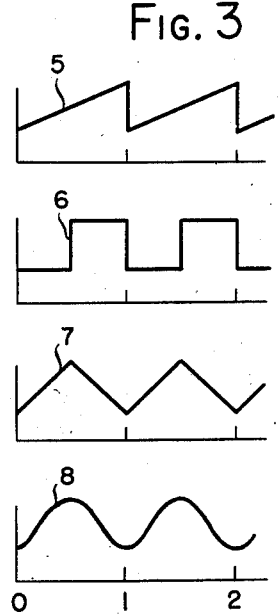

The curves 5, 6, 7 and 8 of Fig. 3 are graphs of various sequences of leading edge spacing and abutment width arrangements similar to that of Fig. 1. The ordinates of the curves represent leading edge spacing and abutment width, while the abcissae represent wheel rotations. The curve 5, of saw tooth form, represents the pattern of Fig. 1, in which the leading edge spacing and width vary linearly with wheel rotation, from a minimum to a maximum. The curve 6, of square waveform, represents a configuration in which there are only two leading edge spacings and abutment widths. Each of these spacings and its accompanying width, exists over a half of the tire circumference, then abruptly changes to the other. Thus, the distances separating corresponding lateral edges of the abutments conforming in spacing to the curve 6 will have a first constant value throughout a first sequence of abutments and a second constant value throughout a second sequence of abutments, the two sequences making up the complete supply of abutments.

The curve 7 represents a configuration in which leading edge spacing and abutment width rise linearly from a minimum to a maximum over half the circumference of the tire and then fall linearly to their original values during the remaining half of the circumference.

The curve 8 represents a configuration in which these values rise and fall in a sine wave or simple harmonic type of variation.

In addition to the types of variation indicated by curves 5 to 8 of Fig. 3, many other recurring patterns of leading edge spacing and abutment width may be employed, as long as there is produced thereby a sound characterized by a regularly and repetitively discontinuous pitch or frequency, the period of the variation of which is synchronously related with the angular velocity of the tire about its rotation axis. It can be seen that the variations of leading edge and abutment width spacing represented by the curves of Fig. 3 will produce such sounds. Variations conforming to curve 5 would provide a series of sounds each rising from a low to a high pitch. The sound of curve 6 would consist of two notes, repeated in alternation. The sounds of curves 7 and 8 would be siren type sounds of rising and falling pitch.

While the variation patterns which have been illustrated do not show more than two cycles of variation per wheel rotation, it should be understood that the invention is not limited to such a number. No matter how many cycles of variation are provided, a distinctive sound would be produced and could be measured, although as the number increased until the frequency or pitch of the sound rose beyond the range of frequencies audible to the human ear, the audibility of the sound would diminish and finally disappear.

It should also be understood that, while the specification has referred to abutments molded onto the sidewall of the tire and while this is the preferred form of the invention, the invention is not limited to molded abutments, but includes abutments of the form and spacing described formed separately of, but fixedly secured to, the sidewall of the tire.

What is claimed is:

1. A pneumatic vehicle tire comprising a plurality of abutments raised from the sidewall of the tire, said abutments being so disposed that corresponding portions thereof lie in a circle coaxial with said tire, the radius of said circle being such that said abutments are out of contact with the road when said tire is properly inflated, but come into contact with the road when the air pressure within the tire falls below a certain value, the radii of said circle which pass through the respective leading edges of said abutments having a non-uniform angular distribution, said distribution being such that rotation of said tire with said abutments in contact with the road produces a distinctive musical sound.

2. A pneumatic vehicle tire comprising a series of abutments raised from the sidewall surface of the tire, said abutments being so disposed that corresponding portions thereof lie in a circle coaxial with said tire, the radius of said circle being such that said abutments are out of contact with the road when said tire is properly inflated, but come into contact with the road when the air pressure within the tire falls below a certain value, the radii of said circle passing through said abutments being angularly separated by amounts which vary in at least one sequence of variation around said circle, each of said sequences producing a similar musical sound when the abutments which it encompasses come into contact with the road as said tire is rotated.

3. A pneumatic vehicle tire comprising a series of abutments raised from the sidewall surface of said tire, said abutments being so disposed that corresponding portions thereof lie in a circle coaxial with said tire, the radius of said circle being such that said abutments are out of contact with the road when said tire is properly inflated, but come into contact with the road when the air pressure within said tire falls below a certain value, the angular amounts separating the radii of said circle passing through the leading edges of said abutments and the widths of said abutments varying together in at least one sequence of variation around said circle, each of said sequences producing a similar musical sound as the abutments which it encompasses come into contact with the road as said tire is rotated.

4. A pneumatic vehicle tire comprising a plurality of abutments raised from the sidewall surface of said tire, said abutments being so disposed that corresponding portions thereof lie in a circle coaxial with said tire, the radius of said circle being such that said abutments are out of contact with the road when said tire is properly inflated, but come into contact with the road when the air pressure within the tire falls below a certain value, the angular amounts separating the radii of said circle passing through the leading edges of said abutments varying progressively by equal increments in at least one sequence around said circle.

5. A pneumatic vehicle tire comprising a plurality of abutments raised from the sidewall surface of said tire, said abutments being so disposed that corresponding portions thereof lie in a circle coaxial with said tire, the radius of said circle being such that said abutments are out of contact with the road when said tire is properly inflated, but come into contact with the road when the air pressure within the tire falls below a certain value, the angular amounts separating the radii of said circle passing through the leading edges of said abutments varying progressively in at least one sequence around said circle.

6. A pneumatic vehicle tire comprising a plurality of abutments raised from the sidewall surface of said tire, said abutments being so disposed that corresponding portions thereof lie in a circle coaxial with said tire, the radius of said circle being such that said abutments are out of contact with the road when said tire is properly inflated, but come into contact with the road when the air pressure within the tire falls below a certain value, the angular amounts separating the radii of said circle passing through the leading edges of said abutments having a first constant value throughout a first sequence of said abutments and having a second constant value throughout a second sequence of said abutments.

7. A pneumatic vehicle tire comprising a plurality of abutments raised from the sidewall surface of said tire, said abutments being so disposed that corresponding portions thereof lie in a circle coaxial with said tire, the radius of said circle being such that said abutments are out of contact with the road when said tire is properly inflated, but come into contact with the road when the air pressure within the tire falls below a certain value, the angular amounts separating the radii of said circle passing through the leading edges of said abutments and the widths of said abutments having first respective constant values throughout a first sequence of said abutments and having second respective constant values throughout a second sequence of said abutments.

8. A pneumatic vehicle tire comprising a plurality of abutments raised from the sidewall surface of said tire, said abutments being so disposed that corresponding portions thereof lie in a circle coaxial with said tire, the radius of said circle being such that said abutments are out of contact with the road when said tire is properly inflated, but come into contact with the road when the air pressure within the tire falls below a certain value, the angular amounts separating the radii of said circle passing through the leading edges of said abutments being so related that rotation of said tire with said abutments in contact with the road produces a sound characterized by a regularly and repetitively discontinuous pitch or frequency, the period of the variation of which is synchronously related with the angular velocity of the tire about its rotation axis.

References Cited in the file of this patent

UNITED STATES PATENTS

| | | |
|---|---|---|
| 2,199,466 | McRaven | May 7, 1940 |
| 2,235,375 | Kraft | Mar. 18, 1941 |

FOREIGN PATENTS

| | | |
|---|---|---|
| 738,045 | Germany | July 31, 1943 |